Aug. 14, 1945. J. T. DALTON 2,382,778
MACHINE FOR SECURING TAGS TO BAG STRINGS
Filed Aug. 3, 1943 6 Sheets-Sheet 3
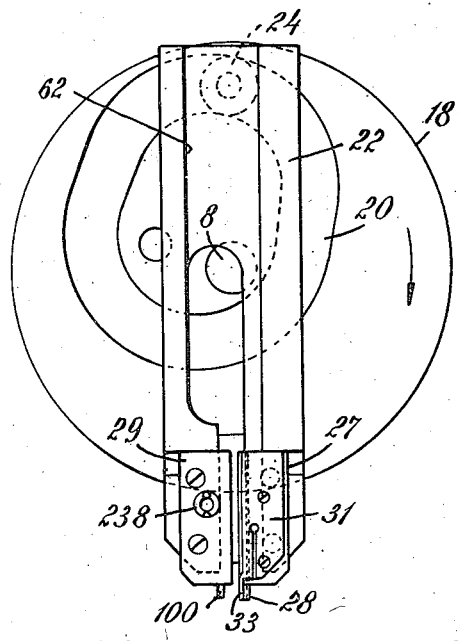
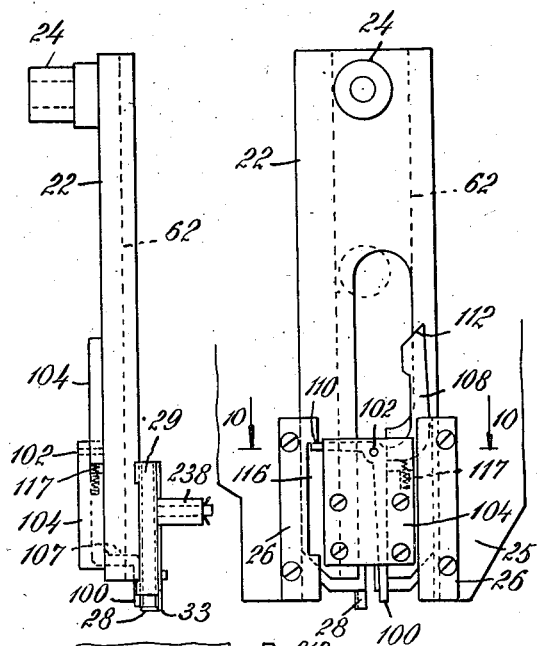
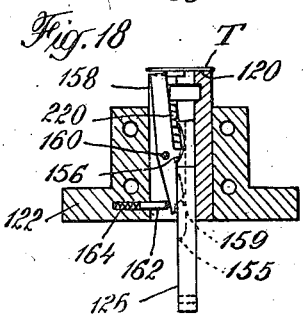
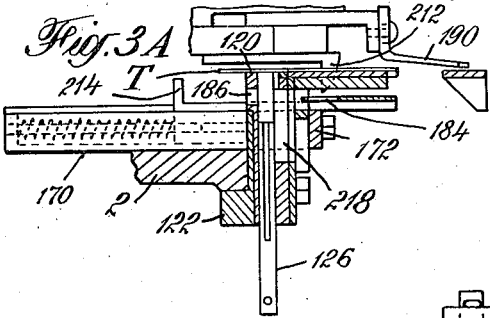
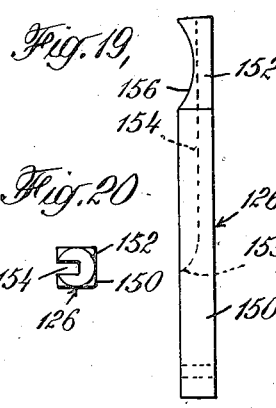
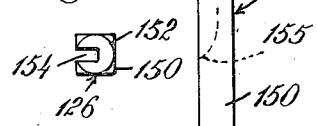
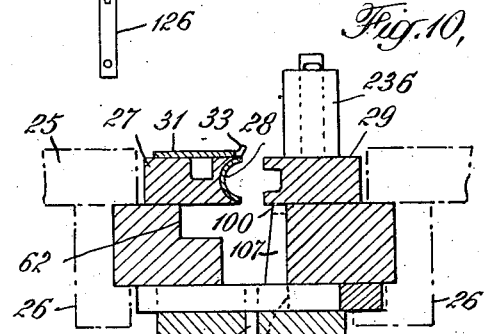
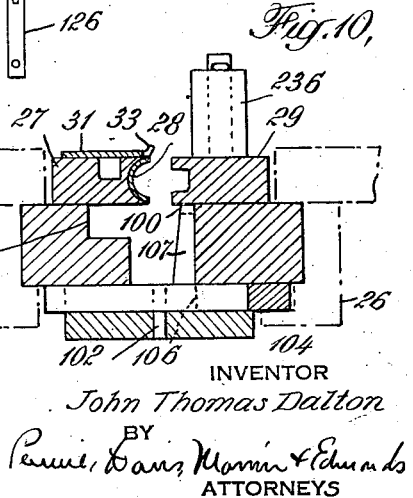
INVENTOR
John Thomas Dalton
BY
*Pennie, Davis, Marvin & Edmonds*
ATTORNEYS

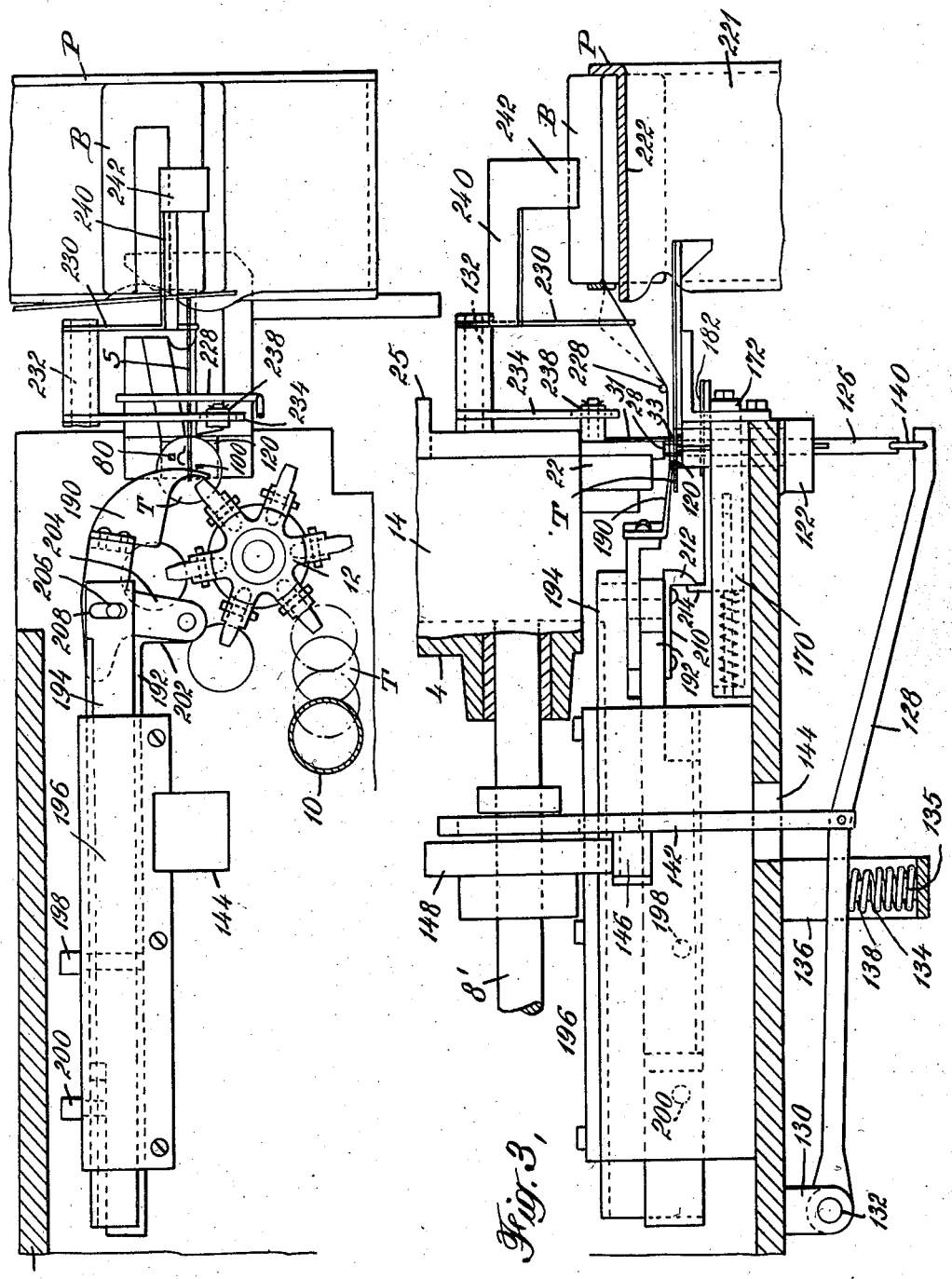

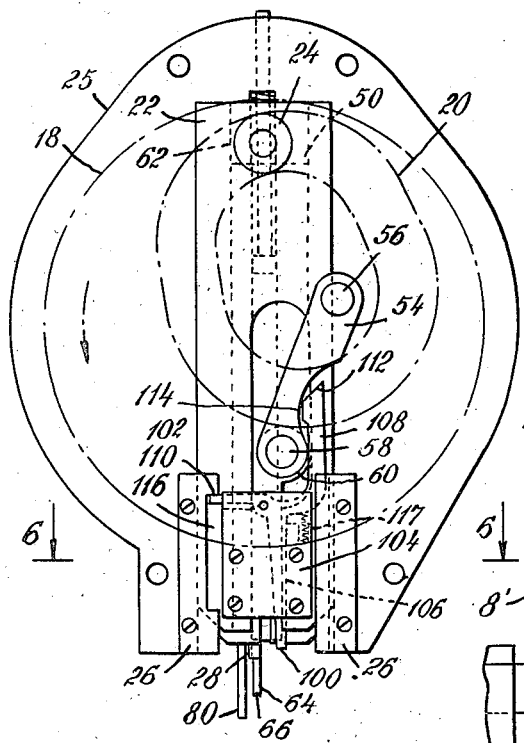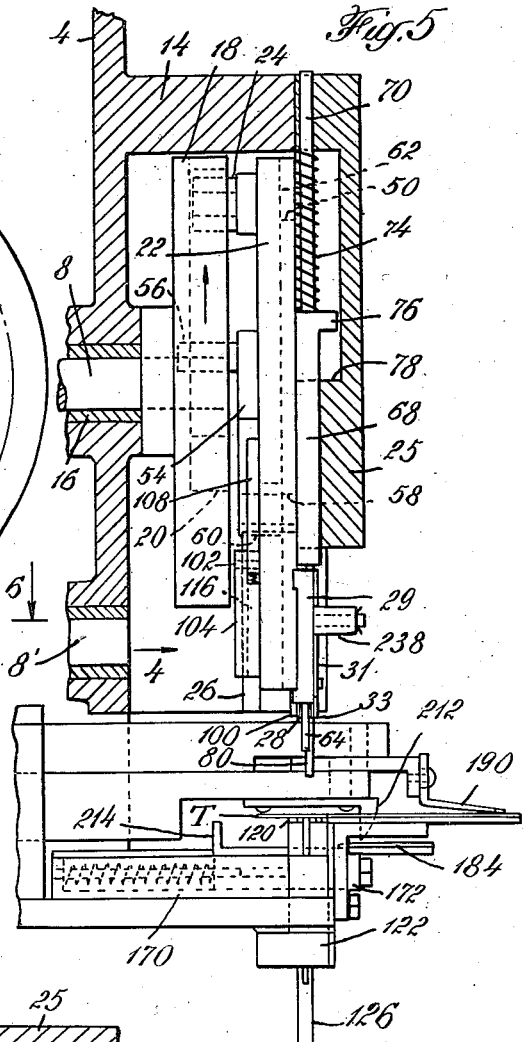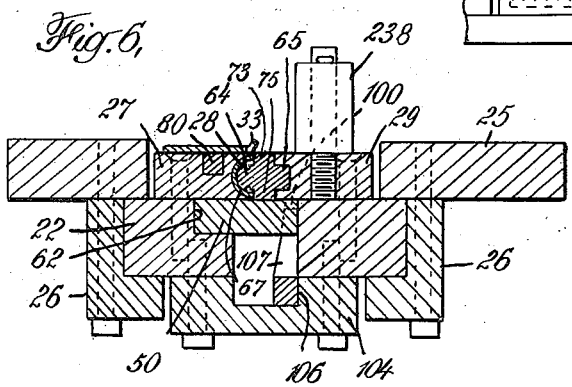

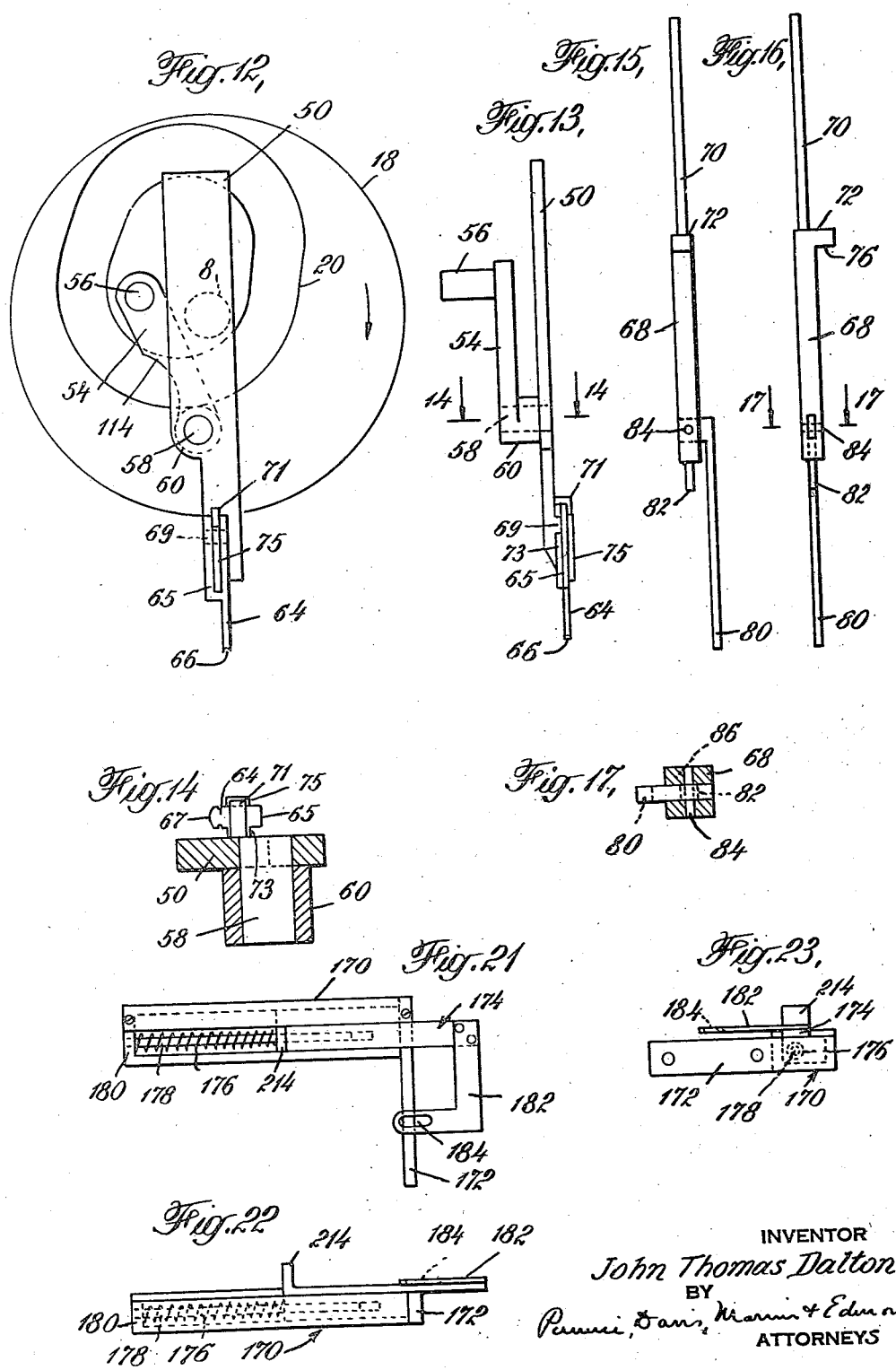

Aug. 14, 1945.  J. T. DALTON  2,382,778
MACHINE FOR SECURING TAGS TO BAG STRINGS
Filed Aug. 3, 1943  6 Sheets-Sheet 6
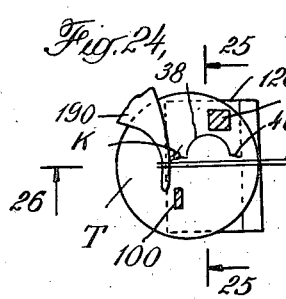
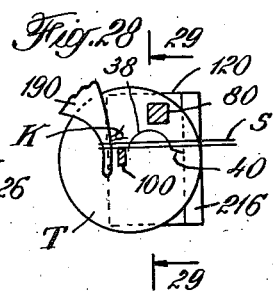
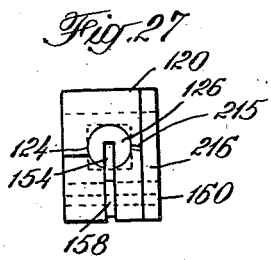
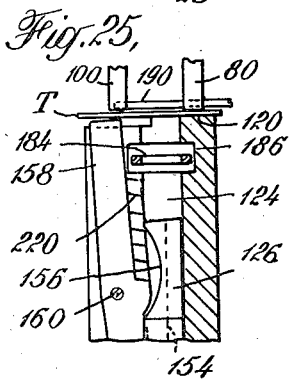
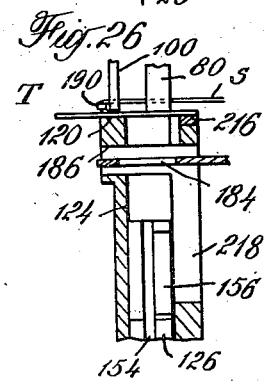
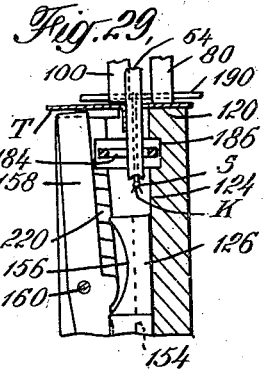
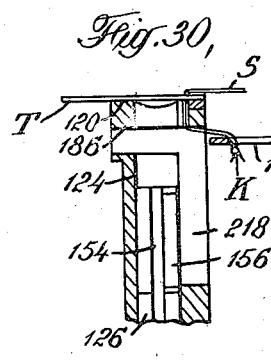
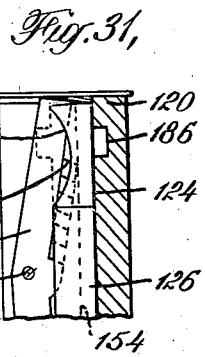
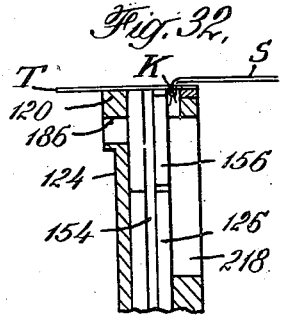
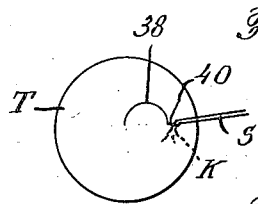
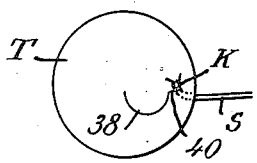
INVENTOR
John Thomas Dalton
BY
ATTORNEYS Patented Aug. 14, 1945

2,382,778

UNITED STATES PATENT OFFICE 2,382,778

MACHINE FOR SECURING TAGS TO BAG STRINGS

John Thomas Dalton, Durham, N. C., assignor to The American Tobacco Company, New York, N. Y., a corporation of New Jersey Application August 3, 1943, Serial No. 497,195

28 Claims. (Cl. 93—91)

This invention relates to a machine for attaching a tag to a string and more particularly to a machine for securing a tag to the string of a bag of the string closure type.

In my prior Patents Nos. 2,207,912, granted July 16, 1940; 2,298,683, and 2,298,684, granted October 13, 1942; I have disclosed and claimed apparatus for stitching a tag to the string of a bag by means of wire. The apparatus includes means for feeding individual tags to the anvil of a wire stitcher, means for guiding the string of a bag over the tag on the anvil, and means for stitching the string to the tag.

The present invention is an improvement over the machines of my prior patents in that I now secure the tag directly to the string and eliminate the use of wire. In the present invention I employ tag feeding means of the type shown in my prior patents and claimed in Patent No. 2,298,683. I also employ the string guiding means disclosed and claimed in Patent No. 2,298,684. I also provide means for feeding the bags to a position adjacent the anvil as disclosed in said last mentioned patent.

In the present invention I provide a head adapted to be arranged over an anvil and having mounted therein a reciprocating cutter slide carrying a cutting element by means of which a slit or cut is formed in a tag on the anvil. I also provide a plunger slide which is reciprocated independently of the cutting element and which carries a plunger to force the string through an opening in the tag. The anvil which I employ is of special construction in that it is provided with a reciprocating member which moves downwardly to permit the plunger to pass through the tag into the anvil and then moves upwardly, as the plunger is withdrawn, to force the material of the tag which is displaced in the cutting operation back to its original position.

The bag string is moved into position over the anvil by the hook mechanism disclosed in my prior Patent No. 2,298,684 and is further positioned, in vertical alignment with the plunger, by a pivoted arm carried by the cutter slide and adapted to move the string into alignment with the plunger after the slit has been cut in the tag.

In the accompanying drawings I have shown one form of the invention. In this showing:

Fig. 2 is a partial, horizontal, sectional view of the machine, parts being shown in elevation;

Fig. 3 is a partial, vertical, sectional view of the machine, parts being shown in elevation;

Figure 1:
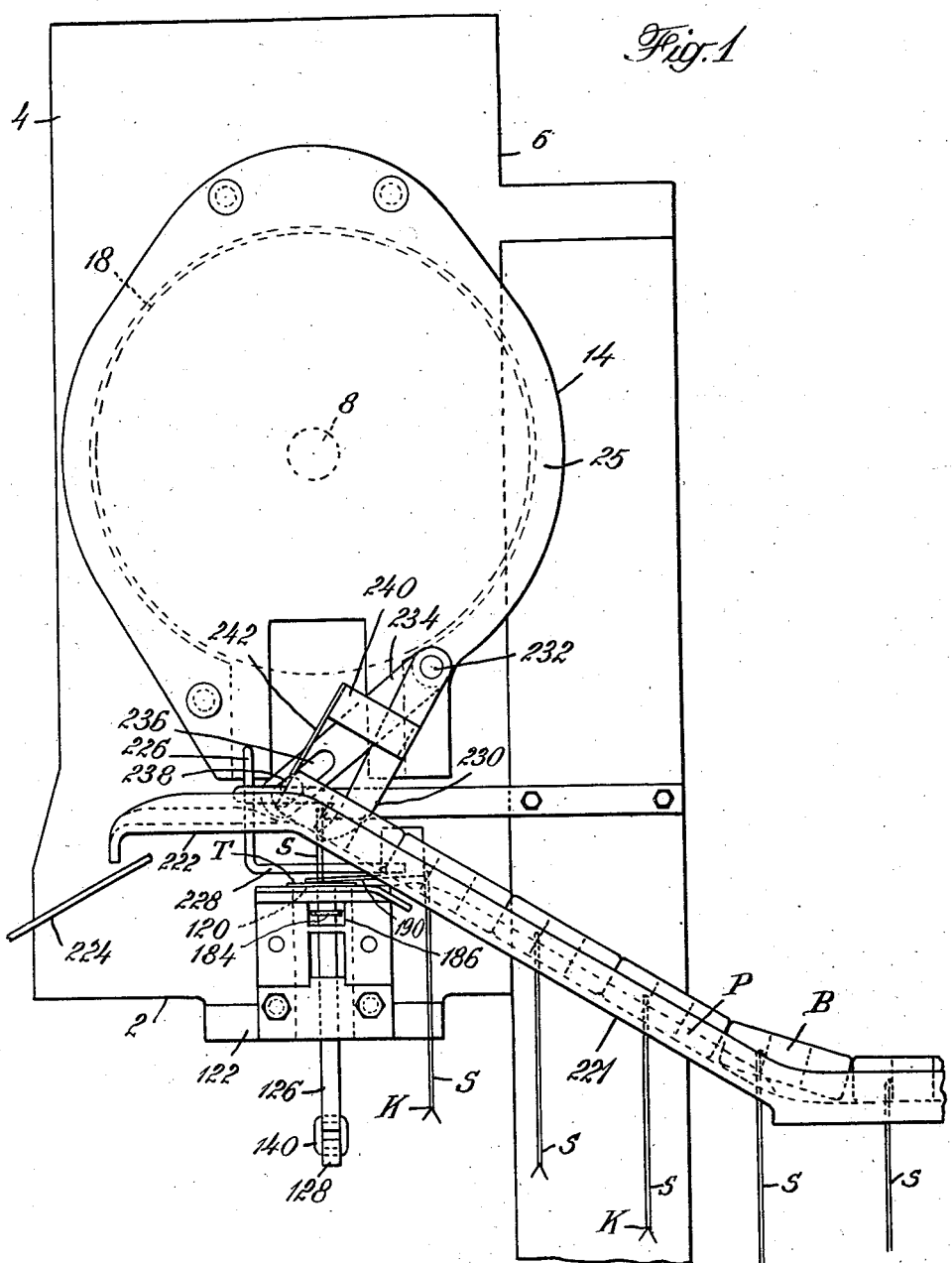
Fig. 1 is a fragmentary front elevation of the machine, parts being omitted for clarity.

Fig. 3—A is a detailed view of the anvil and associated parts;

Fig. 4 is a rear elevation of the head looking in the direction of the arrow in Fig. 5 of the drawings;

Fig. 5 is a vertical, sectional view of the head;

Fig. 6 is a horizontal, sectional view on line 6—6 of Fig. 4;

Fig. 7 is an elevational view of the cutter slide with the position of the cam indicated, viewed from the opposite side from Fig. 4;

Fig. 8 is a side elevation of the cutter slide;

Fig. 9 is an elevation of the opposite side from Fig. 7;

Fig. 10 is a horizontal, sectional view on line 10—10 of Fig. 9;

Fig. 11 is a detailed view of a cutting element;

Fig. 12 is a front elevation of the plunger slide;

Fig. 13 is a side elevation;

Fig. 14 is a horizontal, sectional view on line 14—14 of Fig. 13;

Fig. 15 is a front elevation of a tag holding member;

Fig. 16 is a side elevation;

Fig. 17 is a horizontal, sectional view on line 17—17 of Fig. 16;

Fig. 18 is a vertical, sectional view of the anvil;

Fig. 19 is an elevational view of a plunger member carried by the anvil;

Fig. 20 is a plan view thereof;

Fig. 21 is a plan view of a shuttle member;

Fig. 22 is a side elevation thereof;

Fig. 23 is a front elevation thereof;

Fig. 24 is a detailed, horizontal view showing the position of the string with respect to the slit after the tag has been cut and before the string has been moved into vertical alignment with the slit;

Fig. 25 is a vertical, sectional view on line 25—25 of Fig. 24;

Fig. 26 is a similar view on line 26—26 of Fig. 24;

Fig. 27 is a plan view of the anvil;

Fig. 28 is a detailed view similar to Fig. 24 showing the position of the string after it has been moved into vertical alignment with the slit in the tag;

Fig. 29 is a sectional view on line 29—29 of Fig. 28, but showing the position of the parts after the plunger slide has lowered and has forced the string through the slit in the tag;

Fig. 30 is a similar view at right angles to Fig. 29 showing the position of the parts after the plunger slide has moved upwardly;

Fig. 31 is a similar view, taken in the same plane as Fig. 29, showing the next position with the anvil plunger nearly at the top of its upward movement;

Fig. 32 is a similar view, in the same plane as Fig. 30, showing the position of the parts when the anvil plunger has completed its upward movement and the string is secured to the tag;

Fig. 33 is a plan view of the string and tag; and

Fig. 34 is a similar view from the opposite side.

The general construction of the machine herein illustrated is similar to the construction shown in my prior Patent No. 2,298,684 in which the filled bags B are delivered along a platform P in front of the anvil and the bag strings guided over a tag T on the anvil to be secured thereto. The frame of the machine comprises a bed plate 2, a pair of end walls, one of which is shown at 4, and a rear wall 6. A shaft 8, corresponding to the cam shaft of my prior patent, is driven in any suitable manner, as for instance, by the drive and gearing shown in the prior patent. This shaft carries the cams by means of which the tag feeding mechanism is operated to deliver tags T from a tube 10 to a spider 12. Each arm of the spider is provided with a stationary jaw and a movable jaw and suitable means, such as disclosed in my prior patents, is provided for opening the jaws for the reception of a tag, closing the jaws, and then again opening the jaws after the tag has been secured to the bag string. The spider is driven by a step by step movement coordinated with the operation of the tag securing means to deliver a tag over the anvil for each operation of the tag securing means.

In place of the stitcher head of my prior patent, I provide a head 14 which is mounted over the anvil and receives the operating parts. The cam shaft 8 extends through a bearing 16 in the head (see Fig. 5) and carries a cam 18. The cam 18 is provided with a cam groove 20 (see Fig. 4). A cutter slide 22 is mounted in the head and carries a roller 24 riding in the groove 20 to reciprocate the cutter slide. As shown (see Figs. 4 and 6), the cutter slide is spaced from the cover plate 25 of the head and is retained in position and guided in its movements by a pair of substantially L-shaped plates 26 secured to the head. The cutter slide carries a pair of plates 27 and 29 on one side, these plates being slightly spaced from each other as shown in Figs. 6 and 10. The side edge of the plate 27 is provided with a substantially semicircular recess and the main cutter element 28 is mounted therein. The cutter element extends beyond the bottom of the plate 27 and the slide, as shown in Fig. 7. A second cutting element is provided on the front of the plate 27 as shown in Fig. 10. This cutting element comprises a supporting member 31 which is secured to the plate 27 and which is provided with a cutter 33 extending from its lower edge. The lower end of the cutter 33 extends downwardly beyond the plate 27, but slightly above the cutter 28. The plate or support 31 may be provided with a slot 35 to give a certain amount of resiliency to the cutting edge. When the cutting elements 28 and 31 pass through the tag T, the element 28 forms a substantially semi-circular cut 38 (see Fig. 33) and the cutting element 31 forms a slit 40 at one end thereof.

The pusher slide 50 is shown in Figs. 12 to 14 of the drawings and its position with respect to the cutter slide is shown in Fig. 6 of the drawings. As shown it is mounted in a cut-out portion 62 of the cutter slide. The pusher member 64 is shaped in cross section to be received between the plates 27 and 29 (see Fig. 6). At one side it is provided with a rib 65 substantially rectangular in cross section, which is received in a similarly shaped groove in the adjacent face of the plate 29 and at the other side it is provided with a substantially semi-circular rib 67 received in the semi-circular recess of plate 27 which receives the cutter element 28. The pusher slide is provided with a transverse rib 69 and with a hook-like arm 71 above the rib 69. The side of the pusher member adjacent the pusher slide is provided with a rib 73 of a width equal to the space between the edges of the plates 27 and 29. This rib is provided with a groove to receive the rib 69 on the pusher slide. To assemble the pusher member to the pusher slide, the upper end of the pusher member is inserted beneath the hook-like member 71 with the rib 69 received in this groove. A rib 75 on the opposite face of the pusher member terminates a slight distance from the top to accommodate the downwardly extending portion of the hook-like member 71.

The pusher slide is reciprocated independently of the cutter slide by means of a crank 54, one end of which receives a pin 56 carried by the cam 18 and mounted off center and the other end of which receives a pin 58 carried by the slide. The pin 58 is mounted in a suitable hub 60 carried by the crank (see Figs. 13 and 14). The pusher member 64 is provided with a concave lower end 66 to receive the string and force it through the tag.

I also provide a holding member which is mounted in the head and which engages the tag after the tag has assumed the proper position on the anvil to hold it in position until the string has been secured thereto. The holding member is shown in detail in Figs. 15 to 17 of the drawings and is shown in assembled position in Fig. 5. As shown, it consists of a main portion 68 having an upper end 70 which is preferably of circular cross section, passing through an opening in the top of the head. A shoulder 72 is formed where the circular portion 70 meets the body portion, and a coil spring 74 is arranged between this shoulder and the top of the casing to normally force the holding member downwardly. Adjacent the shoulder the body portion 68 is provided with an enlargement 76. The slides and the holding member are removable with cover plate 25, and the cover plate is provided with a shoulder 78 to limit the downward movement of the holding member and prevent it from becoming displaced when the cover plate is removed. The lower portion of the holding member is provided with a pair of arms 80 and 82, the former being of greater length than the latter, and projecting beyond the bottom of the head when in lowered position as shown in Fig. 4. The member 80 reciprocates in a suitable guide-way or recess formed in the plate 27. The member 82 may be formed as an extension of the body portion 68 and the member 80 may be formed of a separate piece which is received in a slot in the body portion and secured thereto by means of a pin 84, as shown on Figs. 15 and 17. The member 82 rests upon the hook-like member of the pusher slide when the holding member is in lowered position and the holding member is raised out of engagement with the tag upon upward movement of the pusher slide.

A string guiding arm 100 is pivotally mounted on the cutter slide and is adapted to move the string S from the position shown in Fig. 24 of the drawings to the position shown in Fig. 28 of the drawings, in vertical alignment with the cut 38—40 after the cutting element has performed its operation. As shown (see Fig. 10) this arm is pivoted at 102 on a plate 104 carried by the cutter slide on the opposite side from the plates 27 and 29.

The string guiding arm is arranged in a cut-out portion 106 of the plate 104 and extends downwardly beyond this plate and the cutter slide a slight distance. The lower end of the arm is provided with a finger 107 (see Figs. 6 and 10) which extends to the opposite side of the cutter slide in proximity to the pusher member 64. The upper end of the string guiding arm is provided with an extension substantially in the form of a bell crank lever, and comprising a pair of arms 108 and 110 (see Fig. 9). The end of the arm 108 is enlarged as at 112. The string guiding arm is swung on its pivot, across the machine, by engagement of the hub 60 with the enlarged end 112 of the arm 108 swinging the lower end of the string guiding arm in a clockwise direction in Fig. 4 of the drawings. The crank 54 is recessed as at 114 to permit it to pass the arm 108 and its enlarged end 112 after the hub has swung the arm on its pivot. The string guiding arm is normally retained in inactive position by a spring 117. This spring is seated in a recess in the plate 104 and engages the arm 108 to swing the parts in a counter-clockwise direction (see Figs. 4, 8 and 9). Return of the arm to inactive position is assured by providing a shoulder formed by a recess 116 in one of the plates 26. The end of arm 110 engages this shoulder to augment the action of spring 117.

An anvil 120 is arranged beneath the head in alignment therewith (see Figs. 3 and 5). The anvil is mounted in a supporting member or holder 122. The detailed construction of the anvil is shown in Figs. 24 to 32 of the drawings. As shown, the anvil is provided with a central bore 124 for the reception of a plunger 126. This plunger is reciprocated in the anvil by an arm 128 (see Fig. 3) which is pivotally mounted on a bracket 130, as at 132. A link 142 is connected to the arm 128 intermediate its ends and this link extends upwardly through a recess in the bed plate. The upper end of the link is in the form of a yoke straddling the shaft 8'. A cam 148 is mounted on the shaft and is engaged by a roller 146 carried by the link 142. The end of the arm 128 is connected to the anvil plunger 126 by a link 140 and the cam is shaped to lower the anvil plunger 126 at the proper time in the cycle of operations. The plunger is moved upwardly to its operative position by means of a spring 134. This spring is mounted on a stud 135 carried by a bracket 136 secured to the base of the machine and straddling the lever 128. The other end of the spring is mounted on a stud 138 carried by the arm 128. Thus the spring exerts an upward force on the arm 128 to move the plunger upwardly when the portion of the cam 148 in engagement with the roller 146 permits upward movement of the arm 128.

The plunger is shown in detail in Figs. 19 and 20 of the drawings. As shown, the lower portion 150 is square or rectangular in cross section, corresponding to the shape of the bore 124 and the upper portion 152 is circular in cross section. The upper portion is also provided with a slot 154 and one side of the upper portion is recessed at 156, the recess terminating in a curved portion 155 at the bottom. A lever 158 (see Fig. 18) is pivotally mounted as at 160 in a lateral extension of the bore 124 and is normally retained in the inoperative position shown in Fig. 18 by a pin 162 which engages the lever adjacent its lower end and which is held in engagement therewith by a spring 164 mounted in a recess in the anvil. The slot 154 extends downwardly in the plunger an appreciable distance, as shown in Fig. 19, and receives an extension 159 on the lever 158 when the plunger is in lowered position. As the plunger moves upwardly, the lower extension moves over the curved portion 155 of the slot, causing the lever to swing in a clockwise direction in Fig. 18 of the drawings and move across the top of the anvil.

A shuttle member (see Figs. 21 to 23) cooperates with the anvil and moves across it a slight distance below the top of the anvil just before the string is fed through the tag and into the anvil by the pusher member 64. The shuttle is mounted on a suitable support 170 arranged on the base plate 2 (see Figs. 3 and 3—A) and this support carries a plate 172 which extends across the machine in front of the anvil holder 122 and is secured thereto. The shuttle 174 is normally forced outwardly to its inoperative position by a spring 176 which surrounds a pin 178 mounted in the back wall 180 of the support 170 and received in a bore in the shuttle member 174. The outer end of the member 174 carries a substantially L-shaped arm 182 and this arm is provided with an eye 184 which, when the shuttle is in its operative position, is in alignment with the bore of the anvil (see Figs. 25 and 26). The shuttle reciprocates in a transverse slot 186 adjacent the top of the anvil (see Figs. 25 and 26).

The string is guided over the anvil in position to be secured to the tag by a reciprocating and oscillating hook 190, similar in construction to the hook employed for this purpose in the machine described and claimed in Patent No. 2,298,684. The hook is also operated by similar operating mechanism and certain details thereof have been omitted from this showing. The hook is pivotally mounted upon the end of a reciprocating member 192. This reciprocating member cooperates with a second reciprocating member 194, the members reciprocating in a suitable guide or frame 196 mounted on the machine. Pins 198 and 200 are carried by these members and these pins receive the ends of levers which are actuated by suitable cams. The member 192 is provided with an arm 202 adjacent its outer end and a substantially L-shaped lever 204 is pivotally mounted thereon and carries the hook 190. This lever is provided with a pin 206 which is received in a slot in the member 194. The hook is thus reciprocated by the reciprocation of the arm 192 and reciprocation of the arm 194 with respect to the arm 192 causes the oscillation of the hook to guide the string over the anvil.

The shuttle is also reciprocated from the arm 192. A plate 210 is carried thereby (see Fig. 3) and this plate is provided with a depending lip 212 which engages an upstanding arm 214 on the shuttle member 174 upon rearward movement of the arm 192 to move the shuttle inwardly against the tension of the spring 176.

The top of the anvil is provided with a slot 215 communicating with the bore 124 and this slot is adapted to receive the cutting edge 31 which forms the slit 40 when the cutter slide descends. The upper edge of the anvil, over which the string is drawn, is provided with a plate 216 of hardened steel or other wear-resisting metal or alloy. One side of the anvil is provided with a slot or cut-out portion 218. The inner face of the lever 158 is provided with ratchet teeth 220. The slot 218 and the teeth 220 are for the purpose of preventing accumulation of lint from the bag strings in the anvil. Upward movement of the plunger 126 causes any lint collected on the lever 158 to be forced out through the cut-out portion 218.

The platform P is substantially channel-shaped and of a width substantially equal to the height of the filled bags. The bags B are fed to the end of the platform at the right of Fig. 1 of the drawings from a tobacco bag filling machine (not shown) and are propelled along the platform by suitable pushing mechanism, timed to deliver a bag to the anvil for each operation of the tag securing mechanism. As shown in Fig. 1, the platform is provided with an inclined portion 221 extending to a position slightly above the anvil and terminating in a horizontal portion 222, which in turn communicates with a discharge chute 224. The bags lie on the platform with the strings S depending from the side of the platform adjacent the machine to be engaged by the hook 190 and carried over the anvil. An arm 226 is secured to the head of the machine and extends downwardly to a point slightly above the anvil at which point it is extended horizontally over the anvil as at 228 (see Figs. 1 to 3). The string is guided under this arm when it is carried across the anvil by the hook. After the string has been forced through the opening in the tag and the material of the tag has been forced back into its initial position, the string is tightened to bring the knot K into firm engagement with the under surface of the tag by an arm 230. This arm is pivotally mounted on a pin 232 on the front of the machine and carries a second arm 234 having a slot 236. The slot 236 receives a stud or pin 238 carried by the plate 29 (see Fig. 6). Reciprocation of the cutter slide and the plate 29 thus oscillates the arm 230 and as it is oscillated, it engages the string when the string is in the full line position shown in Fig. 3 of the drawings, moving it to the dotted line position shown and thus causing the end of the string which has been passed through the tag and is in the shuttle to be moved from the position shown in Fig. 30 of the drawings to the position shown in Fig. 32 of the drawings.

This arm 230 has a lateral extension 240 which carries a second arm 242 arranged at right angles to the arm 230. The arm engages the edge of the bag to retain the bag in proper position while the tag is being secured thereto.

The operation of the machine will be apparent from the foregoing description. As in the machine disclosed in my prior Patent No. 2,298,684, the bags B are propelled along the platform P by a suitable pusher mechanism to present one bag to a position in front of the anvil upon each operation of the head. In Fig. 4 of the drawings the cutter slide is shown in raised position with the roller 24 at the top of the cam groove. As the cam revolves, the cutter slide is lowered. As the plate 29, carried by the cutter slide, moves downwardly allowing the holding member to move, the spring 74 forces it downwardly to engage a tag which has been delivered to the anvil by the tag feeding mechanism. The member 80 projects below the cutting members 28 and 31, when the cutting members are in raised position, and therefore effectively holds the tag in position on the anvil before the descent of the cutters. The continued downward movement of the cutter head causes the cutting members 28 and 31 to pass through the tag, forming the substantially semi-circular cut 38 and the slit 40.

The cutting member 28 enters the top of the bore in the anvil and the cutting member 31 enters the slot 215.

While the cutting slide is at the bottom of its stroke and before it starts upwardly, the pin 56 and the crank 54 are in such position that the pusher slide starts its downward stroke. The hub 60 then engages the arm 108 to swing the string positioning lever 100 on its pivot and move the string S from the position shown in Fig. 24 of the drawings to the position shown in Fig. 28 of the drawings, thus disposing the string in vertical alignment with the slit in the tag and with the pusher member 64. The hook 190 has previously been moved forwardly, oscillated to engage the loop of the string S depending from the bag on the platform, and moved to the rear position shown in Fig. 2 of the drawings. As the pusher member 64 moves downwardly, the plunger 126 is in its lowered position and the shuttle 174 is moved into the anvil against the tension of the spring 176 by the arm 212. The pusher member travels downwardly into the bore of the anvil and through the shuttle as shown in Fig. 29 of the drawings. The hook 190 has, in the meantime, been oscillated by the reciprocating members 192 and 194 to release the string. The pusher member 64 moves upwardly out of the bore of the anvil and the shuttle moves forwardly to the position shown in Fig. 30 of the drawings. The knot K engages the edge of the opening 184 in the shuttle, causing the string to move with the shuttle. The anvil plunger 126 starts its upward movement causing the lever 158 to swing on its pivot in a clockwise direction under the face of the anvil. This pushes the tab that has been cut in the tag and has been displaced by the pusher member back to its original position. Further upward movement of the plunger causes the face of the plunger to engage this tab cut from the tag and return it to the plane of the tag as indicated in Figs. 33 and 34.

At about the time the tab has been entirely replaced by the plunger, as indicated in Fig. 31, the arm 230 is swung on its pivot by the pin 238 riding in the slot 236 and this arm engages the string extending from the bag on the platform under the bar 228 as indicated in full lines in Fig. 3 of the drawings. The movement of the arm 230 exerts a pull on the string moving it to the dotted line position shown in Fig. 3 of the drawings and causing the string to be drawn through the tag. This brings the knot K snugly against the underside of the tag as indicated in Fig. 32 of the drawings, thus causing the tag to be firmly secured to the string with the string arranged in the slit 40.

As the arm 230 swings on its pivot, the bag holding arm 242 moves from engagement with the side of the bag and the pusher mechanism then move the bags along the platform, bringing another bag into position for the next operation.

I claim:

1. Apparatus for securing a tag to a string comprising means for forming a cut in the tag, means for feeding the string through the cut, and means for restoring the cut-out portion of the tag to its initial position.

2. Apparatus of the character described comprising an anvil, means for delivering a tag to the anvil, means for guiding a string over the anvil, a reciprocating cutter mounted over the anvil and adapted to form a cut in a tag on the anvil, and a second reciprocating member to force the string through the cut in the tag.

3. Apparatus of the character described comprising an anvil, means for delivering a tag to the anvil, a reciprocating and oscillating hook to guide a string over the anvil, a reciprocating cutter mounted over the anvil and adapted to form a cut in a tag on the anvil, and a second reciprocating member to force the string through the cut.

4. Apparatus of the character described comprising an anvil, means for delivering a tag to the anvil, means for guiding a string over the anvil, a reciprocating cutter mounted over the anvil and adapted to form a cut in a tag on the anvil, a second reciprocating member to force the string through the cut in the tag, and means for replacing the cut-out portion of the tag.

5. Apparatus of the character described comprising an anvil, a head mounted over the anvil, a cutter slide reciprocatingly mounted in the head, the cutter slide having a cutting member curved in horizontal cross section and a second cutting member arranged adjacent thereto to form a substantially semi-circular cut in the tag with a slit at one end thereof, and a second reciprocating member mounted in the head to force the string through the cut.

6. Apparatus of the character described comprising an anvil, a head mounted over the anvil, a cutter slide reciprocatingly mounted in the head, the cutter slide having a cutting member curved in horizontal cross section and a second cutting member arranged adjacent thereto to form a substantially semi-circular cut in the tag with a slit at one end thereof, a second reciprocating member mounted in the head to force the string through the cut, and means for replacing the cut-out portion of the tag.

7. Apparatus of the character described comprising an anvil, a head mounted over the anvil, a cutter slide reciprocatingly mounted in the head, the cutter slide having a cutting member curved in horizontal cross section and a second cutting member arranged adjacent thereto to form a substantially semi-circular cut in the tag with a slit at one end thereof, a second reciprocating member mounted in the head to force the string through the cut, and a reciprocating plunger mounted in the anvil and adapted to replace the cut-out portion of the tag.

8. Apparatus of the character described comprising an anvil having a vertical bore, means for delivering a tag to the anvil, means for guiding a string over the anvil, a reciprocating cutter mounted over the anvil and adapted to form a cut in a tag on the anvil, a second reciprocating member to force the string through the cut, a reciprocating plunger mounted in the bore of the anvil to replace the cut-out portion of the tag, and a shuttle mounted to reciprocate into the anvil beneath the top thereof to receive the end of the string when it is forced through the tag by the second reciprocating member.

9. An anvil comprising a body portion having a vertical bore, a plunger reciprocatably mounted in the bore, a lever pivotally mounted in the anvil and having its upper end arranged to oscillate over the upper end of the bore, and means carried by the plunger for oscillating the lever.

10. Apparatus of the character described comprising an anvil, means for delivering a tag to the anvil, means for guiding a string over the anvil, a head arranged over the anvil, a cutter slide reciprocating in the head, a cutting member carried by the lower edge of the cutter slide and adapted to form a cut in the tag on the anvil, a pusher slide mounted in the cutter slide and capable of relative movement with respect thereto, and means for reciprocating the pusher slide.

11. Apparauts of the character described comprising an anvil, means for delivering a tag to the anvil, means for guiding a string over the anvil, a head mounted over the anvil, a reciprocating cutting member mounted in the head and adapted to form a cut in a tag on the anvil, a second reciprocating member to force the string through the cut, and means for holding the tag on the anvil, said means being controlled by the reciprocation of the cutter to release the tag after the string has been forced through the cut.

12. Apparatus of the character described comprising an anvil, means for delivering a tag to the anvil, means for guiding a string over the anvil, a reciprocating cutter mounted over the anvil and adapted to form a cut in a tag of the anvil, a second reciprocating member to force the string through the cut in the tag, and means for moving the string into alignment with the second reciprocating member.

13. Apparatus of the character described comprising an anvil, means for delivering a tag to the anvil, means for guiding a string over the anvil, a reciprocating cutter mounted over the anvil and adapted to form a cut in a tag of the anvil, a second reciprocating member to force the string through the cut in the tag, and means for holding the tag on the anvil.

14. Apparatus of the character described comprising an anvil, means for delivering a tag to the anvil, a reciprocating and oscillating hook to guide a string over the anvil, a reciprocating cutter mounted over the anvil and adapted to form a cut in a tag on the anvil, a second reciprocating member to force the string through the cut, and means for moving the string into alignment with the second reciprocating member.

15. Apparatus of the character described comprising an anvil, means for delivering a tag to the anvil, a reciprocating and oscillating hook to guide a string over the anvil, a reciprocating cutter mounted over the anvil and adapted to form a cut in a tag on the anvil, a second reciprocating member to force the string through the cut, and means for holding the tag on the anvil.

16. Apparatus of the character described comprising an anvil, means for delivering a tag to the anvil, means for guiding a string over the anvil, a reciprocating cutter mounted over the anvil and adapted to form a cut in a tag on the anvil, a second reciprocating cutter to force the string through the cut in the tag, means for moving the string into alignment with the second reciprocating member, and means for replacing the cut-out portion of the tag.

17. Apparatus of the character described comprising an anvil, means for delivering a tag to the anvil, means for guiding a string over the anvil, a reciprocating cutter mounted over the anvil and adapted to form a cut in a tag on the anvil, a second recipricating cutter to force the string through the cut in the tag, means for holding the tag on the anvil, and means for replacing the cut-out portion of the tag.

18. Apparatus of the character described comprising an anvil, a head mounted over the anvil, a cutter slide reciprocatingly mounted in the head, the cutter slide having a cutting member curved in horizontal cross section and a second cutting member arranged adjacent thereto, the cutting members being adapted to form a semi-circular cut in the tag with a slit at one end thereof, a second reciprocating member mounted in the head to force the string through the cut, and means for moving the string into alignment with the second reciprocating member.

19. Apparatus of the character described comprising an anvil, a head mounted over the anvil, a cutter slide reciprocatingly mounted in the head, the cutter slide having a cutting member curved in horizontal cross section and a second cutting member arranged adjacent thereto, the cutting members being adapted to form a semi-circular cut in the tag with a slit at one end thereof, a second reciprocating member mounted in the head to force the string through the cut, and means for holding the tag on the anvil.

20. Apparatus of the character described comprising an anvil having a vertical bore, means for delivering a tag to the anvil, means for guiding a string over the anvil, a reciprocating cutter mounted over the anvil and adapted to form a cut in a tag on the anvil, a second reciprocating member to force the string through the cut, means for holding a tag on the anvil, a reciprocating plunger mounted in the bore of the anvil to replace the cut-out portion of the tag, and a shuttle mounted to reciprocate into the anvil beneath the top thereof to receive the end of the string when it is forced through the tag by the second reciprocating member.

21. Apparatus of the character described comprising an anvil having a vertical bore, means for delivering a tag to the anvil, means for guiding a string over the anvil, a reciprocating cutter mounted over the anvil and adapted to form a cut in a tag on the anvil, a second reciprocating member to force the string through the cut, means for moving the string into alignment with the second reciprocating member, a reciprocating plunger mounted in the bore of the anvil to replace the cut-out portion of the tag, and a shuttle mounted to reciprocate into the anvil beneath the top thereof to receive the end of the string when it is forced through the tag by the second reciprocating member.

22. An anvil comprising a body portion having a vertical bore, a plunger reciprocatingly mounted in the bore, a lever pivoted in the anvil and having its upper end arranged to oscillate over the upper end of the bore, means carried by the plunger for oscillating the lever, and a shuttle mounted to reciprocate into the anvil beneath the top thereof.

23. An anvil comprising a body portion having a vertical bore, a plunger reciprocatingly mounted in the bore, one side of the plunger being provided with a recess, and a lever pivotally mounted in the anvil, one end of the lever being received in the recess in the plunger when the plunger is in lowered position and being adapted to ride out of the recess as the plunger reciprocates to oscillate the lever.

24. An anvil comprising a body portion having a vertical bore, a plunger reciprocatingly mounted in the bore, one side of the plunger being provided with a recess, a lever pivotally mounted in the anvil, one end of the lever being received in the recess in the plunger when the plunger is in lower position and being adapted to ride out of the recess as the plunger reciprocates to oscillate the lever, and a shuttle mounted to reciprocate into the anvil beneath the top thereof.

25. Apparatus of the character described comprising an anvil, means for delivering a tag to the anvil, means for guiding a string over the anvil, a head arranged over the anvil, a cutter slide reciprocating in the head, a cutting member carried by the lower edge of the cutter slide and adapted to form a cut in the tag on the anvil, a pusher slide mounted in the cutter slide and capable of relative movement with respect thereto, means for reciprocating the pusher slide, a member mounted on the pusher slide to force the string through the cut in the tag, and means for moving the string into alignment with said member.

26. Apparatus of the character described comprising an anvil, means for delivering a tag to the anvil, means for guiding a string over the anvil, a head arranged over the anvil, a cutter slide reciprocating in the head, a cutting member carried by the lower edge of the cutter slide and adapted to form a cut in the tag on the anvil, a pusher slide mounted in the cutter slide and capable of relative movement with respect thereto, means for reciprocating the pusher slide, a member mounted on the pusher slide adapted to force the string through the cut in the tag, a pivoted lever mounted on the cutter slide to move the string into alignment with said member and means for actuating said lever.

27. Apparatus of the character described comprising an anvil, means for delivering a tag to the anvil, means for guiding a string over the anvil, a head arranged over the anvil, a cutter slide reciprocating in the head, a cutting member carried by the lower edge of the cutter slide and adapted to form a cut in the tag on the anvil, a pusher slide mounted in the cutter slide and capable of relative movement with respect thereto, means for reciprocating the pusher slide, a member mounted on the pusher slide adapted to force the string through the cut in the tag, and a pivoted lever mounted on the cutter slide and adapted to move the string into alignment with the pusher member, said lever being actuated by the pusher slide.

28. Apparatus of the character described comprising an anvil, means for delivering a tag to the anvil, means for guiding a string over the anvil, a head arranged over the anvil, a cutter slide reciprocating in the head, a cutting member carried by the lower edge of the cutter slide and adapted to form a cut in the tag on the anvil, a pusher slide mounted in the cutter slide and capable of relative movement with respect thereto, means for reciprocating the pusher slide, and a spring pressed member to engage a tag on the anvil and hold it in position, said spring pressed member being moved out of engagement with the tag by the cutter slide on the upward stroke of the cutter slide.

JOHN THOMAS DALTON.